W. J. MAIN.
SHEET DELIVERING MECHANISM.
APPLICATION FILED MAR. 20, 1909.
1,050,842.
Patented Jan. 21, 1913.
7 SHEETS—SHEET 1.
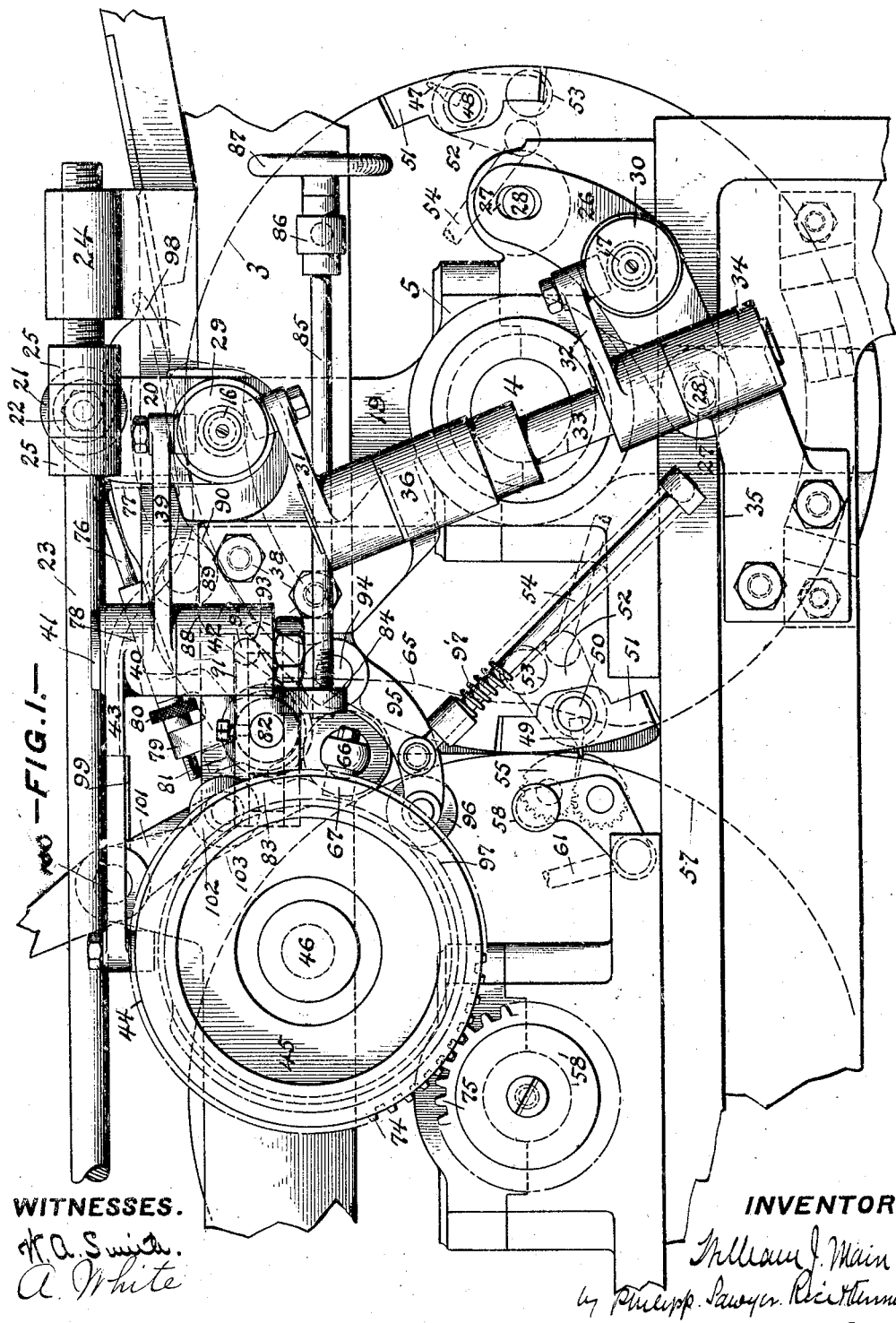
WITNESSES.
H. A. Smith.
A. White.
INVENTOR.
William J. Main
by Philipp. Sawyer. Rice & Kennedy
ATT'YS.

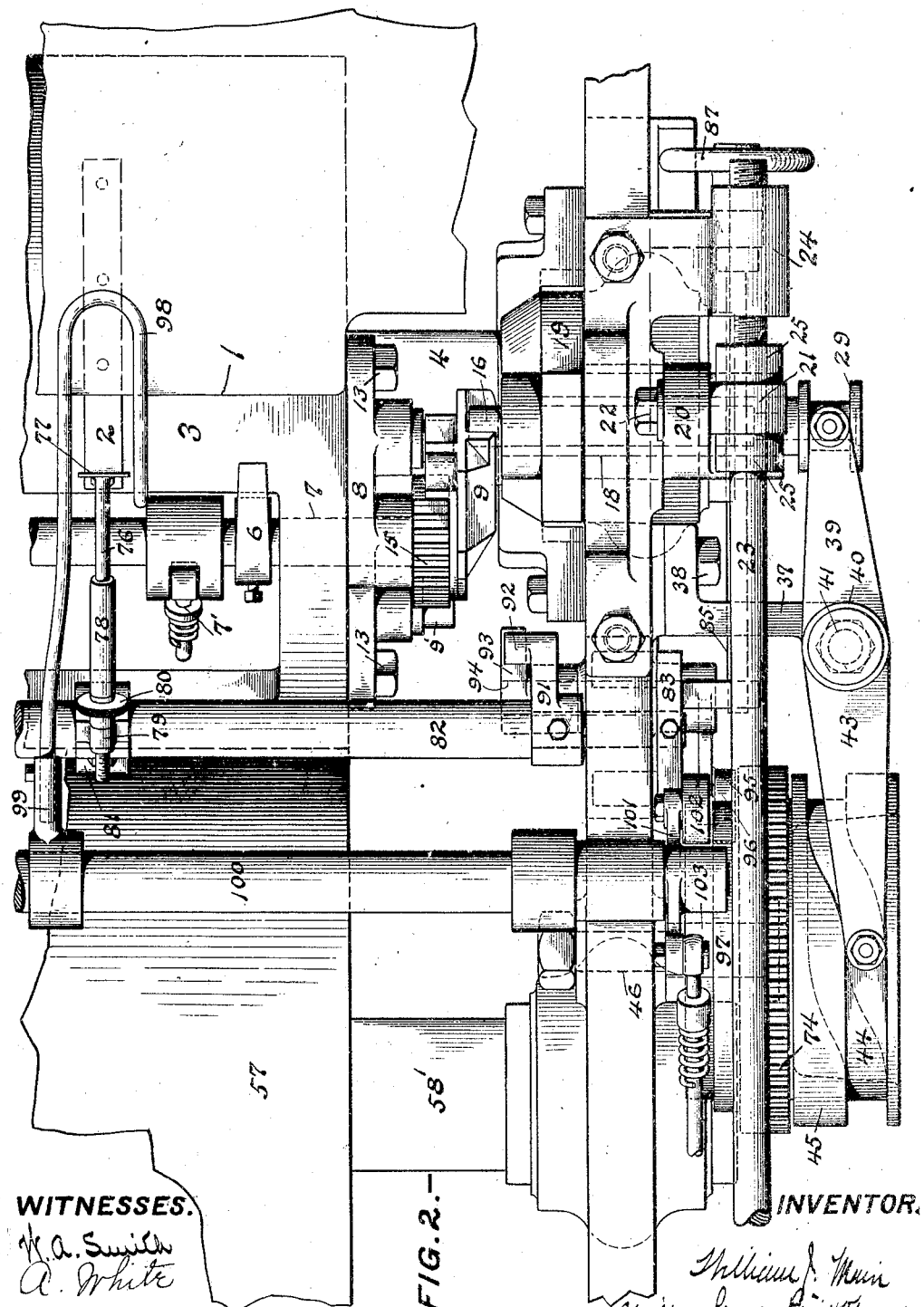

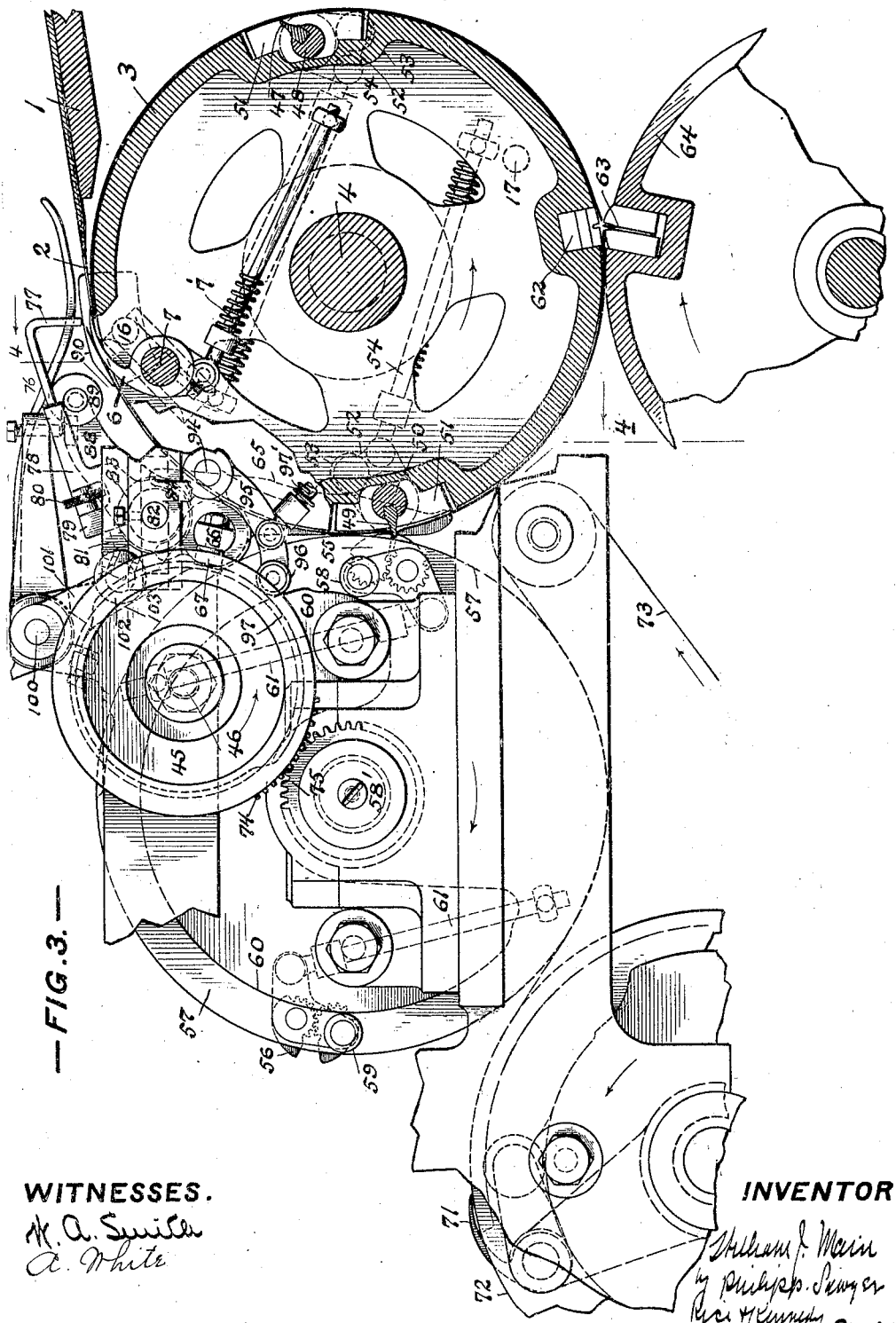

W. J. MAIN.
SHEET DELIVERING MECHANISM.
APPLICATION FILED MAR. 20, 1909.
1,050,842.
Patented Jan. 21, 1913.
7 SHEETS—SHEET 4.
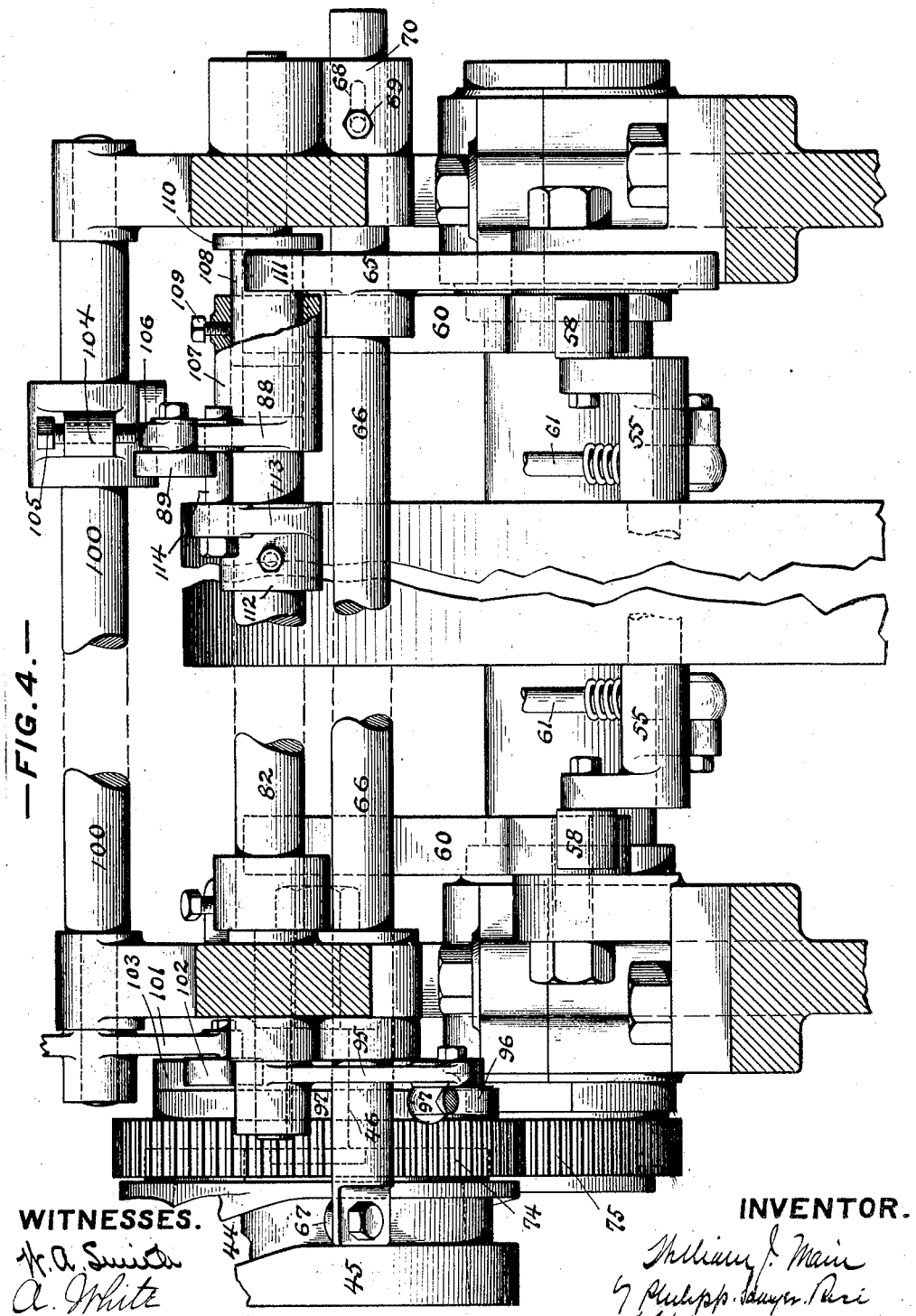
WITNESSES.
INVENTOR.
ATT'YS.

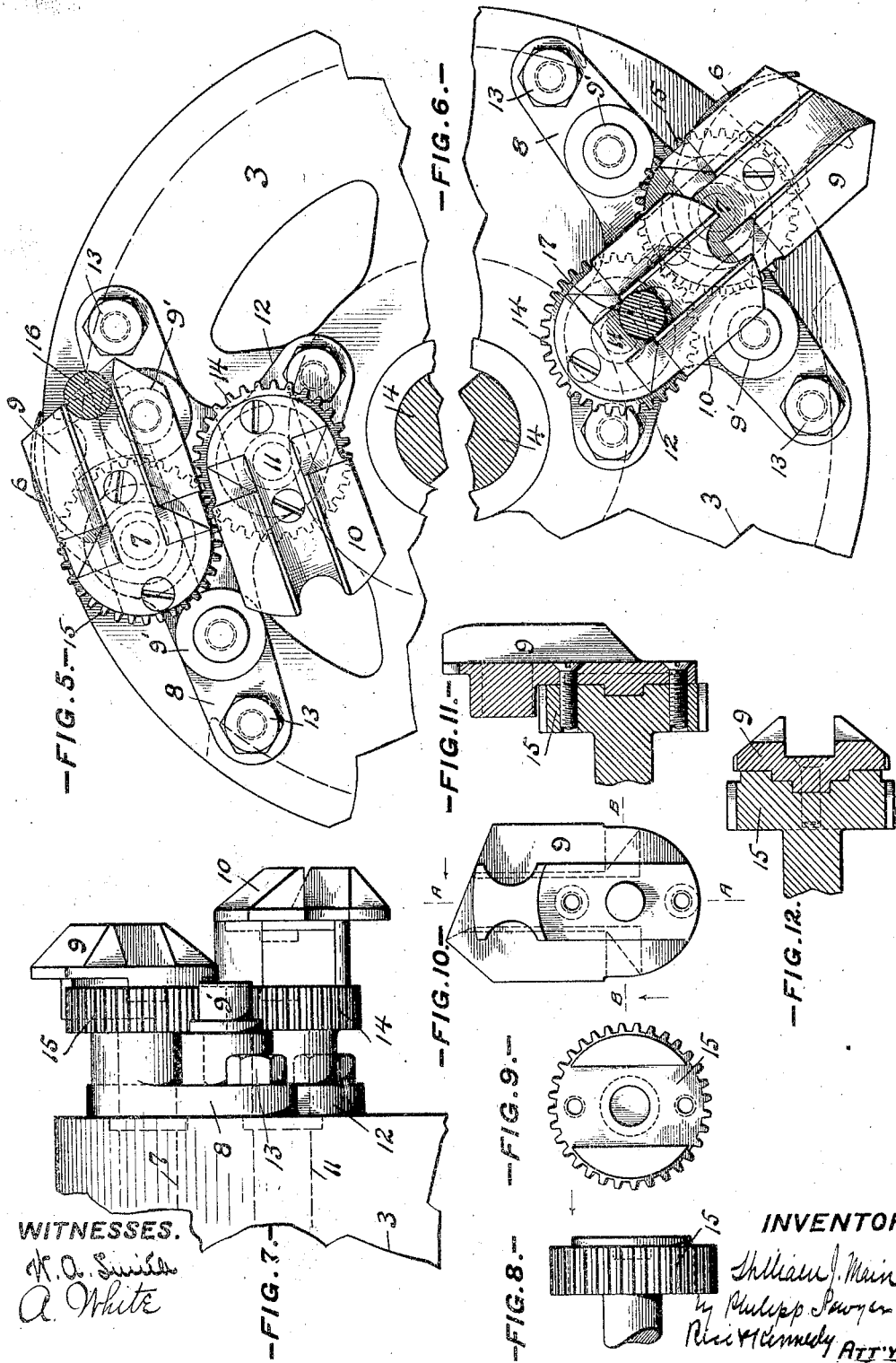

W. J. MAIN.
SHEET DELIVERING MECHANISM.
APPLICATION FILED MAR. 20, 1909.
1,050,842.
Patented Jan. 21, 1913.
7 SHEETS—SHEET 6.
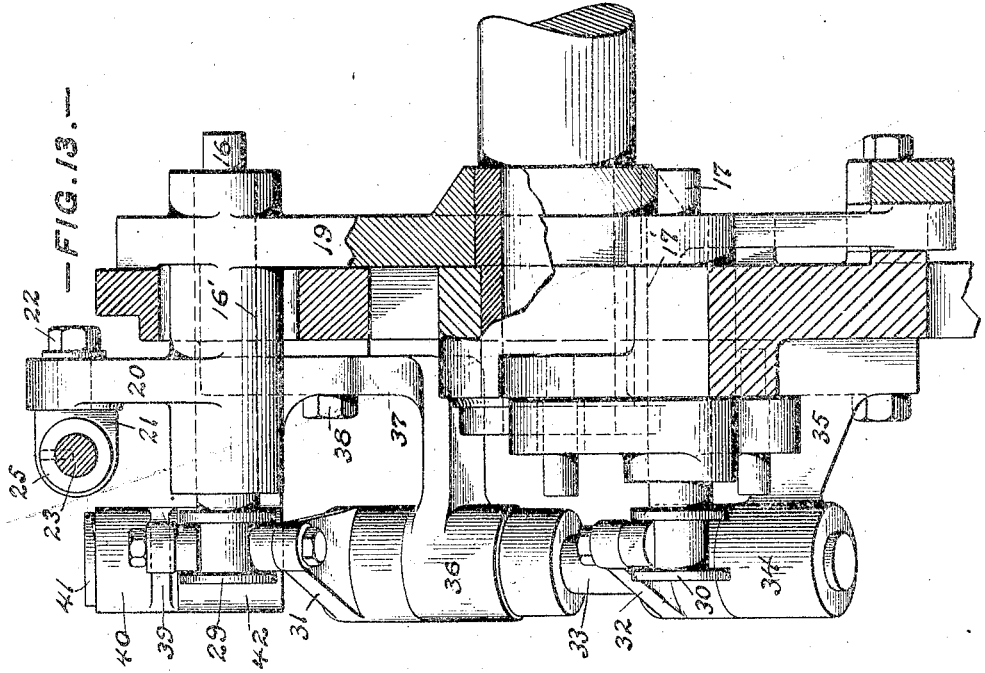
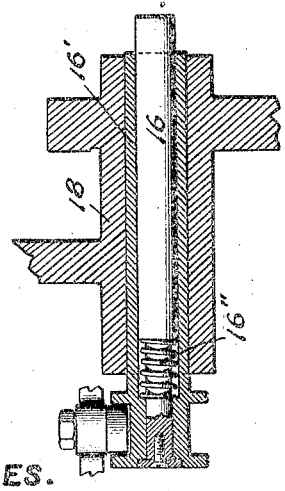
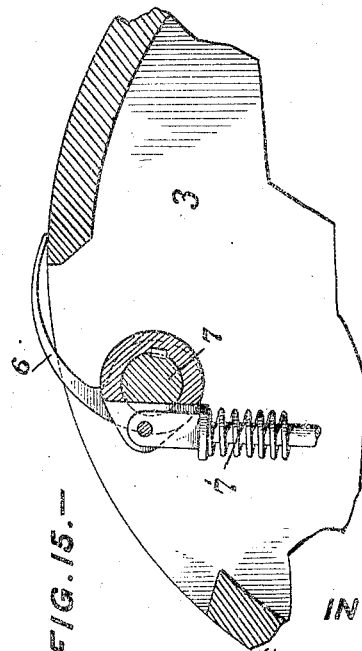
WITNESSES.
INVENTOR.
ATT'YS.

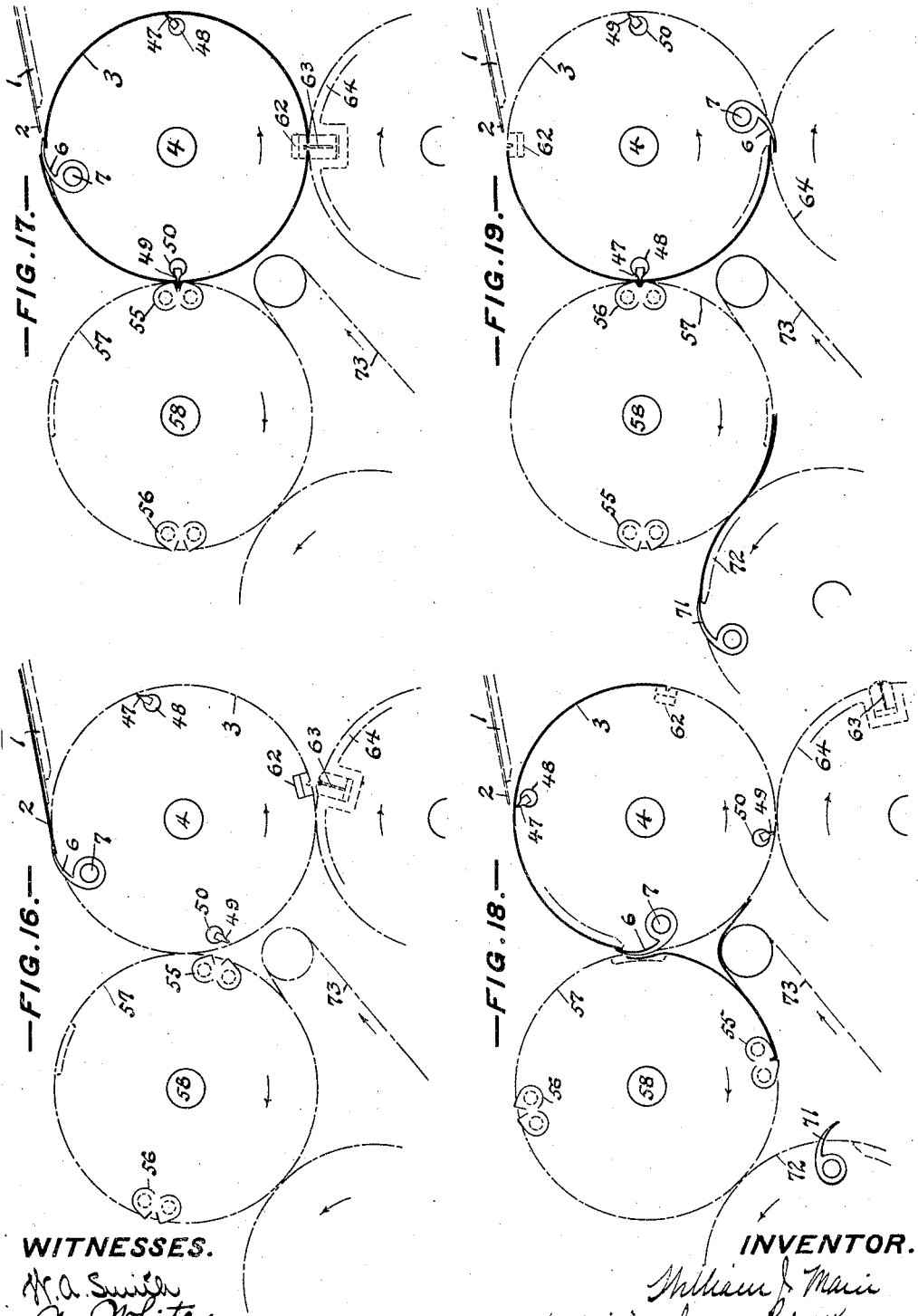

UNITED STATES PATENT OFFICE.

WILLIAM J. MAIN, OF WESTPORT, CONNECTICUT, ASSIGNOR, BY MESNE ASSIGNMENTS, TO R. HOE AND CO., OF NEW YORK, N. Y., A CORPORATION OF NEW YORK.

SHEET-DELIVERING MECHANISM.

1,050,842.     Specification of Letters Patent.     Patented Jan. 21, 1913.

Application filed March 20, 1909. Serial No. 484,743.

*To all whom it may concern:*

Be it known that I, WILLIAM J. MAIN, a citizen of the United States, residing at Westport, county of Fairfield, and State of Connecticut, have invented certain new and useful Improvements in Sheet-Delivering Mechanisms, fully described and represented in the following specification and the accompanying drawings, forming a part of the same.

This invention relates to improvements in mechanism for forwarding sheets of paper to enable a subsequent operation or operations, such, for instance, as cutting, folding, etc., to be effected.

One of the objects of the invention is to produce a sheet forwarding mechanism including a carrier provided with sheet taking and retaining devices, the construction being such that the sheet, after being taken by said devices, may be divided transversely to its path of travel and delivered in separate parts.

A further object of the invention is to produce a mechanism for forwarding sheets, said mechanism being provided with sheet taking and retaining devices and including improved actuating means for said devices, whereby their operation may be effected with a minimum amount of noise and shock to the operating parts.

A further object of the invention is to produce a mechanism for forwarding sheets, said mechanism employing a rotary carrier and sheet taking and retaining devices and including means for controlling the time of operation of the sheet taking and retaining devices, thereby enabling the sheet to be accurately positioned on the carrier.

A further object of the invention is to produce mechanism for forwarding sheets, said mechanism including a rotary carrier and sheet taking and retaining devices, and also including improved means for effecting the registration of the sheets prior to the time they are taken by the sheet taking devices.

With these and other objects not specifically referred to in view, the invention consists in certain constructions and in certain parts, improvements and combinations as will be hereinafter fully described and then specifically pointed out.

In the accompanying drawings—Figure 1 is a side elevation of sheet forwarding mechanism embodying the invention. Fig. 2 is a plan view. Fig. 3 is a side elevation, similar to Fig. 1, but with the parts on a smaller scale, with certain parts of the sheet carrier cut away to show the interior construction of the carrier. Fig. 4 is a section on the broken line 4—4 of Fig. 3. Fig. 5 is a detail face view illustrating more particularly the actuating mechanism for the sheet taking and retaining devices. Fig. 6 is a view similar to Fig. 5 but showing the parts in a different position. Fig. 7 is a side elevation of the construction shown in Fig. 5. Figs. 8, 9, 10, 11 and 12 are detail views illustrating the construction of the mechanism shown in Fig. 5. Fig. 13 is a detail view illustrating the construction of certain devices which may be employed in connection with the operation of the sheet taking and retaining devices. Fig. 14 is a detail view of one of the operating pins which may be employed. Fig. 15 is a sectional view illustrating the construction of the sheet taking and retaining grippers which may be employed. Figs. 16, 17, 18 and 19 are diagrams illustrating the operation of the mechanism.

The machine which has been selected to illustrate the invention is a rotary folding machine designed more particularly for the folding of sheets. When the invention is embodied in a sheet folding machine, sheets may be presented to the mechanism which is thereafter to operate upon them in any suitable manner. In the construction shown, the sheets are supported upon a feedboard 1 provided with suitable sheet supporting fingers 2, as is usual in such constructions.

Machines embodying the invention will include a carrier which may be of any suitable construction, but in the best constructions will consist of a cylinder, as 3. As shown, this cylinder is mounted upon a shaft 4 supported, as usual, in journal boxes 5 mounted in the frame of the machine. Machines embodying the invention will include devices mounted upon the carrier for taking the sheets from the sheet presenting means and retaining them on said carrier. While the construction of these devices may be varied, in the machine shown, they comprise a set of grip-fingers, only one, 6, of these fingers being shown, as they are of the usual type.

The means for supporting and operating the sheet taking and retaining devices may be varied, but when, as in the construction shown, these devices consist of grippers, they will, in the best constructions embodying the invention, be mounted upon a shaft, this supporting shaft, in the machine illustrated, being marked 7 and being shown as backed up by the usual spring rod construction, indicated at 7'. This shaft 7, in the particular construction illustrated, is mounted at one end in a bracket 8 secured to one of the cylinder heads, the other end of the shaft being mounted in any suitable manner, as, for instance, in the opposite cylinder head.

When the operating means for the sheet taking and retaining devices include a shaft, it may be operated in various ways. In the particular construction illustrated, two actuators are employed, one for moving the shaft to cause the taking and retaining devices to take the sheet and one for moving the shaft in the opposite direction to cause these devices to release the sheet. As illustrated, these actuators, (see Fig. 5) comprise grooved blocks 9, 10, the block 9 being shown as fast to the shaft 7. The block 10, in the machine illustrated, is mounted on a stud 11 supported in an extension 12 of the bracket 8, secured, as has been stated, to the head of the cylinder in any suitable manner, as by bolts 13.

When, as in the machine illustrated, two actuators are employed, the connections by which they are made effective may be widely varied. As has been pointed out, in the machine shown the actuator 9 is secured directly to the shaft 7. The stud 11, however, which carries the actuator 10, is provided with a gear 14 meshing with a gear 15 mounted on the shaft 7. When either block is moved therefore, the other block is correspondingly moved by means of the gearing. Stops, as studs 9', may be employed, to limit the movement of the blocks, and, if desired, the block 9 may be provided with a stop block having curved recesses on each side to engage with these stops.

The operating devices for the actuators may be varied in construction, but, in the best constructions embodying the invention when grooved blocks such as have been referred to are employed, these coöperating actuating means will usually include pins, one of which is suitably located so as to operate one of the actuator blocks for the purpose of causing the sheet taking and retaining devices to take a sheet and the other of which operates the other actuator block to cause the sheet taking and retaining devices to release the sheet. In the particular machine illustrated, two such pins are employed, one of these pins, marked 16, (see Fig. 5) coöperating with the block 9 to rock the shaft 7 and close the grippers 6, and the other of said pins, marked 17, being so located as to coöperate with the block 10, and through the intermediate gearing rock the shaft 7 in the reverse direction to open the grippers. To prevent the pins from being broken, the pin 16 may be provided with a socket 16' and the pin 17 with a socket 17', the inner ends of the pins being shouldered and backed up by springs 16'', as shown in Fig. 14, this construction allowing the pins to yield if the blocks are misplaced.

Whatever be the construction of the sheet taking devices and their operating means, it will, in the best constructions embodying the invention, be of such a character that the time of operation of the sheet taking and retaining devices may be varied, the purpose of this variation being to enable the sheet to be taken at varying distances from its edge, so that it may be accurately positioned upon the carrier and with respect to the devices which are to subsequently operate upon it. In the best constructions embodying the invention, these devices will be of such a character that the adjustment by which the variation is effected may be accomplished while the mechanism is in operation. In the particular machine illustrated (see Figs. 1, 2 and 13) the operating pin 16 is mounted in an elongated hub 18 formed, as illustrated, in one piece with an arm 19 supported on the cylinder shaft 4. This hub 18 extends through an opening in the frame and is provided, outside thereof, with an arm 20. This arm 20 supports a pivoted perforated boss 21 secured in position, in any suitable manner, as, for instance, by a nut 22. Extending through this pivoted boss 21 is a rod 23 which, as shown, has a threaded end (see Fig. 1) which is tapped into a nut 24 secured to the frame of the machine. The rod 23 is provided with collars 25 which are located on each side of the pivoted boss 21, these collars being fast on the rod. The rod may be operated in any suitable way, as, for instance, by a hand wheel, not shown. It is apparent that by turning the rod it will be moved longitudinally in one direction or the other and through the connections described, swing the pin 16 around the shaft 4 as a center, thus positioning it so that it will strike the actuator block earlier or later in the revolution of the carrier, and thus operating the grippers earlier or later, so that they will take the sheet nearer or farther from its edge.

When a pin, such as 17, or equivalent device is employed, for effecting the operation of the sheet taking and retaining devices, this pin will, in the best constructions embodying the invention, be adjustably mounted. As shown, the pin 17 is supported (see Fig. 1) in a bracket 26, this bracket being provided with slots 27 through which pass bolts 28, the bracket being adjustably secured to the machine by these means, so that, as its position is varied, the position of the pin 17 is varied accordingly.

The means employed for operating the pins 16, 17 or equivalent devices, which may be used, may be varied and will vary according to the particular construction of devices employed. In the machine shown, the socket 16' which holds the pin 16 is provided with a grooved collar 29 and the socket 17' which holds the pin 17 is provided with a similar collar 30. These collars are engaged respectively by rolls on arms 31, 32 supported on a shaft 33 which is mounted at one end in a bearing 34 on a bracket 35 bolted to the frame. The other end of the shaft 33 is supported in a bearing 36 formed on a bracket 37 secured to the frame by bolts 38, or in any other suitable manner. The collar 29 is also engaged by a roll on the end of an arm 39, this arm extending from a hub 40 supported on a stud 41 in turn supported in a bearing 42 formed on the bracket 37. The hub 40 has also extending from it an arm 43 provided with a roll which engages a cam groove 44 in a drum 45 supported on a stud 46 mounted on the machine frame. It is apparent that as the arm 43 is rocked by its cam, the pin 16 will, through the connections described, be moved inward and outward in its supporting hub 18 and that the pin 17 will be similarly moved through the described connections between the pins.

In machines embodying the invention in all its features, the sheets will be cut transversely to their path of travel and the parts of the sheets thus formed will be delivered separately. This separate delivery of the parts of the sheets may be effected in various ways. The particular machine illustrated folds off the rear part of the sheet on one revolution of the carrier and the head part of the sheet on the next revolution.

The cutting and folding means employed may be varied in construction. In the particular construction illustrated, the carrier is provided with a folding blade 47 mounted on a shaft 48, and it is also provided with a second folding blade 49 mounted on a shaft 50. These shafts 48 and 50 are supported in bearings 51 located in recesses in the cylinder, and one end of each shaft is provided with an operating block 52, these blocks carrying operating rolls 53. Spring rod constructions 54 of the usual type may be provided, the rods of these constructions being connected to the operating blocks.

When, as in the particular machine illustrated, folding or tucking blades are employed, suitable folding devices which may be varied in construction will be employed in connection with the blades. In the construction illustrated, these coöperating folding devices comprise pairs of intergeared folding jaws 55, 56, these jaws being mounted on a carrying cylinder 57 mounted on a shaft 58 supported in suitable bearings in the frame. For convenience in construction, and to avoid the use of long jaws which are liable to spring, two pairs of jaws 55 (see Fig. 4) may be employed, one of these pairs operating at one end of the folding blade and the other pair of jaws operating at the other end of the blade. Similarly, two pairs of jaws 56 may be employed. One jaw of each of the pairs 55, in the construction shown, is provided with an operating roll 58, and one jaw of each of the pairs 56 is provided with a similar roll 59, these rolls coöperating with cams 60 secured to the frame (see Figs. 3 and 4). Suitable spring rods 61 may also be employed in connection with these jaws, as is common in this class of constructions.

While the cutting mechanism employed may be of any suitable type, in the particular machine illustrated, the carrier 3 is provided with a cutting block 62 located between the folding blades 47, 49. This cutting block coöperates with a knife 63 mounted on a knife carrier 64, the construction being a usual one.

When the machine embodying the invention employs the folding devices of the type illustrated, the folding blades may be operated in any suitable manner. In the particular machine shown, these blades are operated (see Fig. 4 and dotted lines in Fig. 3) by a cam 65, this cam being arranged to be moved into and out of operative position. While the means for moving this cam may be varied, in the construction shown, it is mounted on a slide rod 66 supported in the side frames of the machine and carrying at its end a roll 67 which engages the groove 44 in the cam drum 45 before referred to. The end of this rod 66 may be slotted, as indicated in dotted lines 68 in Fig. 4, this slot being engaged by a bolt 69 in a boss 70 projecting from the frame, this construction serving to prevent the rod from turning as it moves.

The jaws 55, 56 may deliver the folded sheets in any suitable manner. In the construction illustrated, the folded sheets are taken from these jaws by grippers 71 on a delivery cylinder 72, the construction being a usual one. If desired, tapes, as 73, will be employed to control the body of the sheets as they are carried around by the grippers.

In order to effect the operations for which the particular machine illustrated is designed, the cam drum 45, when the same is employed, should be driven. In the particular construction illustrated, this drum is provided with a gear 74 meshing with a gear 75 mounted on the shaft 58' of the carrier 57, the gears being proportioned so that the carrier and its shaft make two revolutions to one revolution of the cam drum. It will be further understood that in the machine illustrated, the carriers 3 and 57 move at the same rate of speed.

The operation of the construction so far described will be well understood from the diagrams, Figs. 16 to 19 inclusive. Referring to these figures, it will be understood that just prior to the time the parts assume the position illustrated in Fig. 16, the pins 16 and 17 have been moved into position and the pin 16 operating in the groove of the actuator block 9 has rocked the gripper shaft and has caused the grippers to take a sheet. The carriers continue their movement and when the parts reach the position shown in Fig. 17, the cutting mechanism comes into operation and divides the sheet, the gripper operating pins having, however, been withdrawn, so that the grippers are not operated as the actuator blocks pass the pin 17. As soon as the cutting devices have operated, the tucking blade 49 is operated and tucks the center of the rear part of the sheet into the jaws 55. After the gripper actuator blocks have passed the pin 16, the pins 16 and 17 are thrown forward into operative position. The carriers continue their movement, thus causing the pin 17 to engage the grooved actuator block 10 and open the grippers, thus releasing the sheet. The head portion of the sheet is then tucked by the blade 47 into the jaws 56. As the carriers continue their movement, the gripper operating pins remain in operative position and the grippers are caused, as the blocks pass the pin 16, to close upon a sheet, and the cycle of operations just described is repeated.

Machines embodying the invention will usually employ a set of registering stops by which the edge of the sheet is properly positioned, before being taken by the grippers. These registering stops, when employed, may be of any suitable construction, but in the best constructions embodying the invention, the construction will be such that all the stops of the set may be adjusted simultaneously. Further, the construction will be such that the adjustment of the set of stops may be effected while the machine is in motion. In the best constructions, furthermore, the construction will be such that each stop of the set may be individually adjusted. In the particular machine shown, these stops,—only one being shown as the stops are duplicates,—comprise a threaded rod 76 provided near its outer end with a stop plate 77. The rod 76 passes through a two part socket 78, 79 a milled nut, as 80, engaging the rod between the two parts of the socket, thereby enabling a longitudinal adjustment of the rod to be effected. As the stops are duplicates, each stop may be individually adjusted in this manner. The means by which the set of stops is adjusted may be varied, but in the particular machine shown, this is effected by adjusting the support on which the stops are mounted. As shown, the two part socket 78—79 is mounted on a bracket 81 clamped to a supporting rock-shaft 82, the adjustment of the set of stops being effected by adjusting the position of the shaft. While the means for adjusting the position of the shaft, when this means for supporting the stops is employed, may be varied, in the particular construction shown, one end of the shaft 82 is mounted in a slide block 83 (see dotted lines in Fig. 1,) this block moving in guides in the frame. The slide block 83 is provided with a threaded hanger 84 engaged by a threaded rod 85 passing through a puppet 86 secured to the frame, the outer end of the rod being provided with a hand-wheel 87. By this construction, it will be observed that the end of the shaft may be given a movement and the stops mounted upon it correspondingly adjusted.

It is obvious that the stops must be raised when the sheet taking devices are to take a sheet. The raising of the stops may be effected by any suitable construction, but in the particular machine shown, the shaft 82 is provided with an arm 88 carrying a roll 89 which is arranged to be struck by a cam 90 secured to the end of the carrier 3, this cam being so positioned that the stops will be raised just as the gripper fingers 6 close down upon the sheet. It is also obvious that the stops should be held in their raised position until such time as the sheet has passed off the feedboard or other sheet presenting device. While this may be effected by various means, in the particular construction illustrated, the shaft 82 (see Figs. 1 and 2) is provided with an arm 91 having on it a contact-piece 92 arranged to engage with a contact piece 93 carried on a short shaft 94 mounted in the frame. This shaft 94 is provided with a curved arm 95 having on its end a roll 96, this arm, in the particular machine illustrated, being backed up by a spring-rod construction 97'. The roll 96 is arranged to run on the periphery of a cam 97, this cam being carried on the hub of the gear 74 before referred to. The high part of this cam runs under the roll just after the stops have been raised by the cam 90, and the construction operates to hold the stops in their raised position until the sheet has been drawn off the feedboard.

Machines embodying the invention in its best form will also include a set of sheet holding fingers, the construction of this set of fingers being, in some respects, similar to that ordinarily employed where a sheet is registered by front stops and taken by grippers. In the particular construction illustrated, these sheet holding fingers comprise a bent wire 98 held in a socket 99 secured to a rock-shaft 100 suitably mounted in the frame. This rock-shaft is provided with an operating arm 101 carrying a roll 102 which runs on a cam 103 also mounted on the hub of the gear 74. It is desirable that the fingers remain for a short space of time in their sheet holding position after the stops have been raised. While the mechanism for raising the fingers may be varied, in the particular machine illustrated, the shaft 100 is provided with an arm 104 carrying a contact screw 105 coöperating with a contact shoulder 106 on the arm 88 before referred to. This contact screw 105 is so adjusted that when the registering stops and the sheet holding fingers are both in operative position, there will be some little space between the end of the screw and the shoulder 106. When, therefore, the shaft 82 rocks to raise the stops, there is no movement of the fingers during the first part of the movement of the shaft, but during the latter part of the movement, the shaft 82 operates through the shoulder and contact screw, to raise the fingers. After the fingers are raised, the cam 103 comes into operation and holds the fingers in their elevated position. It is desirable, in order that as much time as possible be allowed for feeding and registering the sheet, that the registering stops and sheet holding fingers come into operative position as soon as possible after the sheet has left the feedboard. In the particular machine shown, the stops and fingers come into position before the cam 90 has passed the roll 89 on the second revolution of the cylinder.

Where the invention is embodied in a machine like the particular machine illustrated, means will be provided which may vary in construction, for preventing the cam 90 from striking the roll 89 on the arm 88 and thus disturbing the position of the stops during the sheet feeding and registering operation. In the particular machine illustrated, the arm 88 is mounted on a hub 107 in the interior of which is secured a sleeve 108, the hub and sleeve being secured together in any suitable manner, as, for instance, by a set screw 109. This sleeve is provided with a flange 110 and the cam 65, before referred to as mounted on the sliding rod 66, is provided with a projection 111 which engages the sleeve between the flange and the end of the hub. As the rod 66 is moved to vary the position of the cam 65 in the manner heretofore described, it is apparent that the hub 107 is similarly moved on the shaft 82. This shaft is further provided with a hub 112 to which is secured an arm 113, provided with a pin 114 which passes through an opening in the arm 88, all as clearly shown in Fig. 4. During the time the cam 90 is passing the roll 89 on the second revolution of the cylinder, the hub 107 is thrown over, so that the roll 89 is out of the path of the cam. When, however, the roll is in the path of the cam, it will be raised, in the manner described, and the shaft 82 will be rocked through the agency of the pin 114 on the arm 113.

Changes and variations may be made in the construction by which the invention is carried into effect. The invention is not, therefore, to be confined to the particular construction hereinbefore shown and described.

What is claimed is:—

1. The combination with a rotary carrier having sheet taking and retaining devices, of means for presenting a sheet thereto, and means operable while the carrier is in motion for varying the time of operation of the sheet taking and retaining devices whereby the sheet is caused to be taken at varying distances from its edge.

2. The combination with a rotary carrier, of means for presenting a sheet thereto, sheet taking devices, actuating mechanism mounted on the carrier for causing said devices to take and release a sheet, coöperating actuating means, and means operable while the carrier is in motion for varying the time of operation of the sheet taking devices whereby the sheet is caused to be taken at varying distances from its edge.

3. The combination with a rotary carrier, of means for presenting a sheet thereto, sheet taking devices, actuating mechanism for said devices mounted on the carrier, coöperating actuating means, means operable while the carrier is in motion for varying the relative position of said actuating mechanism and actuating means whereby said devices are caused to operate earlier or later in the revolution of the carrier, sheet registering devices, and means for varying the position of the sheet registering devices.

4. The combination with a rotary carrier, of sheet retaining grippers, an actuating shaft thereof, a tumbler block for operating the shaft, a coöperating pin, and means operable while the carrier is in motion for varying the position of the pin whereby the grippers are caused to operate earlier or later in the revolution of the carrier.

5. The combination with a rotary carrier, of means for presenting a sheet thereto, a set of sheet taking and retaining devices, and operating means for said devices, said means including an actuator for moving said devices into taking position, a second actuator for moving said devices into releasing position, and connections between the actuators whereby when one actuator is moved the other actuator is correspondingly moved.

6. The combination with a rotary carrier, of means for presenting a sheet thereto, a set of sheet taking and retaining grippers, a shaft for operating the grippers to take and release the sheet, an actuator block for moving the shaft in one direction, a second actuator block for moving the shaft in the opposite direction, connections between the blocks and shaft, means for operating the blocks, and connections between the blocks whereby when one block is moved the other block is correspondingly moved.

7. The combination with a rotary carrier, of means for presenting a sheet thereto, a set of sheet taking and retaining grippers, a shaft on which the grippers are mounted, a pair of grooved actuator blocks, connections between the blocks and the shaft, connections between the blocks whereby when one block is moved the other is correspondingly moved, a pin for operating one of the blocks to move the shaft in one direction, and a second pin for operating the other block to move the shaft in the opposite direction.

In testimony whereof, I have hereunto set my hand, in the presence of two subscribing witnesses.

WILLIAM J. MAIN.

Witnesses:
F. W. H. CRANE,
GEO. V. WILLIAMSON.

Copies of this patent may be obtained for five cents each, by addressing the "Commissioner of Patents, Washington, D. C."